(12) United States Patent
Murakami et al.

(10) Patent No.: US 6,678,317 B1
(45) Date of Patent: Jan. 13, 2004

(54) ADAPTIVE EQUALIZER DEVICE AND METHOD FOR CONTROLLING ADAPTIVE EQUALIZER

(75) Inventors: Shuji Murakami, Tokyo (JP); Kazuya Yamanaka, Tokyo (JP); Hiroyuki Mizutani, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/256,175

(22) Filed: Feb. 24, 1999

(30) Foreign Application Priority Data

Aug. 27, 1998 (JP) ............................................ 10-241625

(51) Int. Cl.$^7$ ................................................. H03H 7/30
(52) U.S. Cl. ........................ 375/232; 375/229; 375/231; 375/233; 375/235
(58) Field of Search ................................ 375/232, 231, 375/234, 235, 261, 229, 233; 708/319

(56) References Cited

U.S. PATENT DOCUMENTS

| | | | |
|---|---|---|---|
| 5,311,546 A | * 5/1994 | Paik et al. ................... | 375/232 |
| 5,809,074 A | * 9/1998 | Werner et al. ............... | 375/233 |
| 5,835,731 A | * 11/1998 | Werner et al. ............... | 375/235 |
| 6,088,389 A | * 7/2000 | Larsson ....................... | 375/231 |
| 6,141,378 A | * 10/2000 | Lantremange ............... | 375/232 |
| 6,314,134 B1 | * 11/2001 | Werner et al. ............... | 375/232 |

OTHER PUBLICATIONS

IEEE Transactions on Signal Processing, vol. COM–28, No. 11, Nov. 1980, "Self–Recovering Equalization and Carrier Tracking in Two Deimensional Data Communication Systems" by Dominique N. Godard, pp. 1867–1875.

IEEE Transactions on Signal Processing, vol. 40, No. 6, Jun. 1992, "Joint Blind Equalization, Carrier Recovery, and Timing Recovery for High–Order QAM Signal Constellations" by Neil K. Jablon, pp. 1383–1398.

* cited by examiner

*Primary Examiner*—Shuwang Liu
(74) *Attorney, Agent, or Firm*—Burns, Doane, Swecker & Mathis, LLP

(57) ABSTRACT

An object is to obtain an adaptive equalizer device and an adaptive equalizer controlling method which provide an ideal output signal certainly and in a shorter time. The adaptive equalizer device includes an adaptive equalizer (4a) receiving a signal indicating a symbol, for filtering the signal indicating the symbol to adaptively remove intersymbol interference by selectively using one of a plurality of preset algorithms, and a rotation detecting circuit (19) receiving an output signal (y(n)) from the adaptive equalizer, for detecting rotation of the symbol of the output signal (y(n)), wherein the adaptive equalizer (4a) selects one of the plurality of algorithms in accordance with detected result flags ($\alpha$, $\beta$) from the rotation detecting circuit (19).

3 Claims, 10 Drawing Sheets

*F I G . 1 6* PRIOR ART
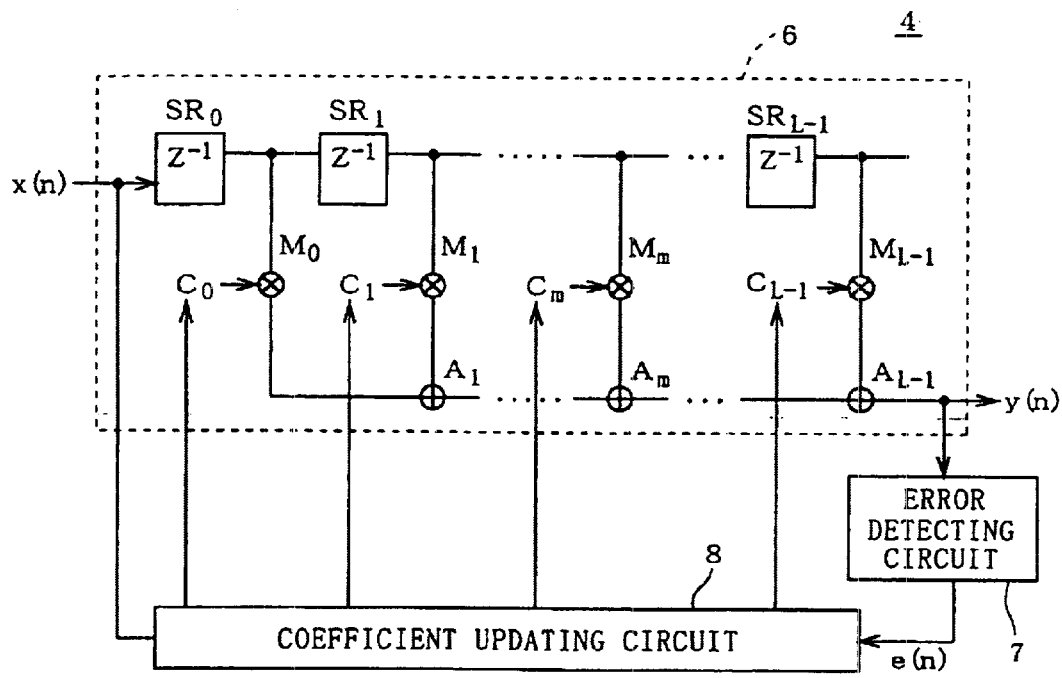
*F I G . 1 7* BACKGROUND ART
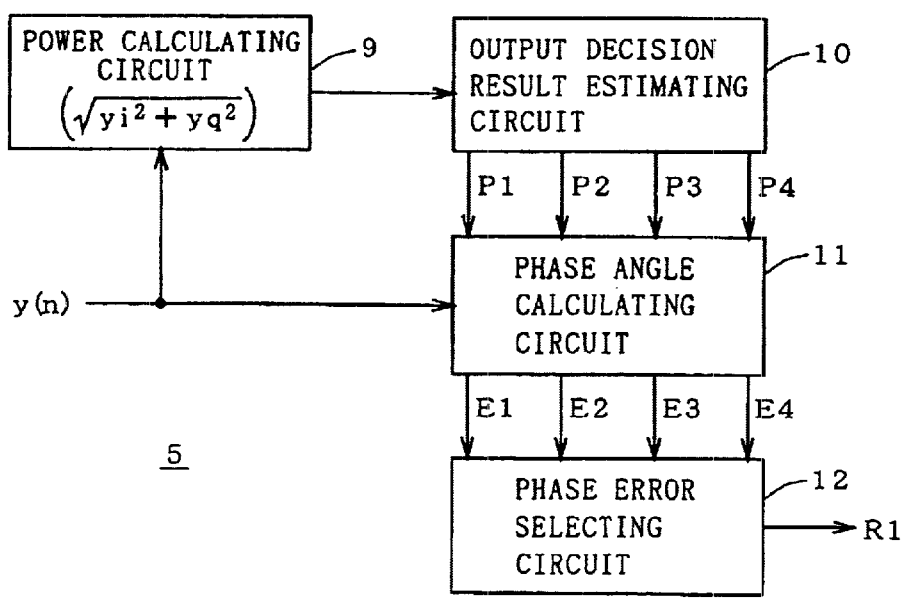

ADAPTIVE EQUALIZER DEVICE AND METHOD FOR CONTROLLING ADAPTIVE EQUALIZER

BACKGROUND OF THE INVENTION

1. Field of the Invention

The present invention relates to an adaptive equalizer device and a method for controlling an adaptive equalizer which are applied to technical fields such as digital communication for digital cable television (CATV), for example.

2. Description of the Background Art

Digital communications such as digital cable television are coming into practice as high-speed data communication systems replacing conventional analog communications. In a digital communication like the digital cable television, a received signal IN transmitted from a transmitting side to a receiving side has the features shown in FIG. 12. That is to say, in a QAM (Quadrature Amplitude Modulation) transmission/reception method, the received signal IN is transmitted for each predetermined period (symbol period SP), as n, n+1, n+2, . . . . The received signal IN includes transmitted data called symbols and a carrier at a high frequency for carrying the symbols.

The digital cable television is susceptible to multipath transmission in which radio waves propagate through a plurality of paths because of reflection at an end of a cable, for example. The presence of multiple delay waves has been confirmed, which occur when a plurality of radio waves caused by multipath transmission overlap. The multiple delay waves cause frequency-selective fading, and the frequency-selective fading causes distortion in the received signal IN.

Next, a conventional receiver will be described. FIG. 13 is a block diagram showing part of a structure of a conventional receiving processing circuit of QAM transmission/reception system. First, an I/Q demodulator 1 removes carrier from the received signal IN and separates the received signal IN into I (In-phase) component xi and Q (Quadrature) component xq. The input signal x(n) indicates the component xi or the component xq. The character (n) indicates that it is a signal in the nth symbol period SP.

The carrier is not completely removed by the I/Q demodulator 1, but may remain in the input signal x(n). The carrier remaining unremoved in the input signal x(n) is referred to as a carrier frequency error.

Next, the carrier frequency error, distortion due to frequency-selective fading, and other components in unwanted frequency bands and noise are removed from the input signal x(n), to obtain an output signal y(n). That is to say, the matched filter 2 removes components in unwanted frequency bands and noise from the input signal x(n). The carrier frequency error removing circuit 3 removes the carrier frequency error from the input signal x(n). The adaptive equalizer 4 removes the distortion due to frequency-selective fading from the input signal x(n), and outputs the distortion-removed input signal x(n) as the output signal y(n). The carrier frequency error detecting circuit 5 detects the carrier frequency error from the output signal y(n) and feedback controls the carrier frequency error removing circuit 3 with the detected result R1. Thus the carrier frequency error removing circuit 3 more completely removes the carrier frequency error from the input signal x(n).

FIG. 14 is a conceptual diagram showing an example of the output signal y(n). The output signal y(n) is composed of 64 pieces of data, for example. The 64 pieces of data each include I component yi and Q component yq. In FIG. 14, the components yi and yq are plotted as dots on the I-Q coordinates, which is called a symbol point arrangement diagram. The character S in FIG. 14 indicates a symbol, which is a group of 64 dots. In FIG. 14, 64 dots form a symbol S, which is called 64-value QAM. When an carrier frequency error occurs, the symbol S rotates as shown in FIG. 15, for example. When the symbol S rotates, processing to the received signal IN becomes difficult.

The carrier frequency error causes the symbol S to rotate for the following reason. In the QAM transmission/reception method, as shown in equation (1) below, the I axis component $zi$ is multiplied by a cosine signal $\cos(wt)$ and the Q-axis component $zq$ is multiplied by a sine signal $\sin(wt)$, and a transmitted signal IN0 obtained by adding them is sent from the transmitting side to the receiving side.

$$IN0 = zi \cdot \cos(wt) + zq \cdot \sin(wt) \tag{1}$$

In equation (1), w indicates the carrier frequency of the transmitted signal IN0, and t indicates time. The received signal IN is expressed by equation (2) below.

$$IN = zi \cdot \cos(wat) + zq \cdot \sin(wat) \tag{2}$$

In equation (2), wa indicates the carrier frequency of the received signal IN.

On the receiving side, the input signal N is multiplied by a cosine signal $\cos(wt)$, as shown in equation (3).

$$IN \cdot \cos(wt) = zi \cdot \cos(wt) \cdot \cos(wat) + zq \cdot \sin(wt) \cdot \cos(wat) = zi \cdot [\cos\{(w-wa)t\} + \cos\{(w+wa)t\}]/2 + zq \cdot [\sin\{(w+wa)t\} + \sin\{(w-wa)t\}]/2 \tag{3}$$

Only the low-frequency component is taken out from equation (3), as xi. That is to say, $$xi = zi/2 \cdot \cos\{(w-wa)t\} + zq/2 \cdot \sin\{(w-wa)t\} \tag{4}$$

Further, on the receiving side, the input signal IN is multiplied by a sine signal $\sin(wt)$, as shown in equation (5).

$$IN \cdot \sin(wt) = zi \cdot \cos(wt) \cdot \sin(wat) + zq \cdot \sin(wt) \cdot \sin(wat) = zi \cdot [\sin\{(w+wa)t\} - \sin\{(w-wa)t\}]/2 + zq \cdot [\cos\{(w-wa)t\} - \cos\{(w+wa)t\}]/2 \tag{5}$$

Only the low-frequency component is taken out from equation (5), as xq. That it to say, $$xq = -zi/2 \cdot \sin\{(w-wa)t\} + zq/2 \cdot \cos\{(w-wa)t\} \tag{6}$$

The I/Q demodulator 1 on the receiving side takes out the components xi and xq from the received signal IN in this way.

In equations (4) and (6), when wa is equal to w, then $$xi = zi/2$$

$$xq = zq/2$$

Where no frequency component remains. That it to say, no carrier frequency error occurs.

However, when wa is not equal to w, frequency component remains. That is to say, a carrier frequency error occurs. Equations (4) and (6) can be expressed in a matrix as $$\begin{pmatrix} xi \\ xq \end{pmatrix} = \begin{pmatrix} \cos\{(w-wa)t\} & \sin\{(w-wa)t\} \\ -\sin\{(w-wa)t\} & \cos\{(w-wa)t\} \end{pmatrix} \cdot \begin{pmatrix} zi/2 \\ zq/2 \end{pmatrix} \tag{7}$$

Equation (7) shows rotation. It is seen from equation (7) that the presence of carrier frequency error causes the symbol S to rotate.

FIG. 16 shows basic structure of the conventional adaptive equalizer 4. The conventional adaptive equalizer 4 includes a discrete filter 6, which serves as the main element, an error detecting circuit 7, and a coefficient updating circuit 8. The discrete filter 6 includes shift registers $SR_0$ to $SR_{L-1}$, multipliers $M_0$ to $M_{L-1}$, and adders $A_1$ to $A_{L-1}$.

Next, operation made by the discrete filter 6 will be described. The discrete filter 6 removes distortion caused by frequency-selective fading from the input signal x(n) and outputs the distortion-removed input signal x(n) as the output signal y(n). The shift registers $SR_0$ to $SR_{L-1}$ delay the input signal x(n) by an amount of delay, $Z^{-1}$. Next, the multipliers $M_0$ to $M_{L-1}$ multiply signals at the respective output nodes (referred to as "taps") of the shift registers $SR_0$ to $SR_{L-1}$ and the coefficients $C_0$ to $C_{L-1}$. Next, the adders $A_1$ to $A_{L-1}$ add the multiplied results obtained by the multipliers $M_0$ to $M_{L-1}$. The sum of the multiplied results from the multipliers $M_0$ to $M_{L-1}$ corresponds to the output signal y(n).

The distortion due to frequency-selective fading may not be completely removed by the discrete filter 6, but may remain in the output signal y(n). The distortion due to frequency-selective fading remaining unremoved in the output signal y(n) is referred to as a distortion error. When the distortion error is large, it causes intersymbol interference. The intersymbol interference means interference in which symbols S transmitted in respective symbol periods SP interfere with each other. On an ideal transmission path with no multipath transmission, no distortion is caused by frequency-selective fading and therefore a certain symbol S does not affect other symbols S transmitted in other symbol periods SP. That is to say, no intersymbol interference occurs. On the other hand, when multipath transmission causes multiple delay waves to occur, frequency-selective fading causes distortion, and then the delay will cause a plurality of symbols S to arrive at the receiving side in the same symbol period SP. That is to say, intersymbol interference occurs.

Accordingly, the error detecting circuit 7 shown in FIG. 16 detects distortion error e(n) from the output signal y(n) to prevent the intersymbol interference. Next, the coefficient updating circuit 8 calculates and updates the coefficients $C_0$ to $C_{L-1}$ on the basis of the distortion error e(n) and the input signal x(n). That is to say, the error detecting circuit 7 and the coefficient updating circuit 8 feedback controls the discrete filter 6. Thus the output signal y(n) becomes closer to an ideal output signal y(n), or an output signal y(n) from which distortion due to frequency-selective fading has completely been removed.

Operations made by the error detecting circuit 7 and the coefficient updating circuit 8 are disclosed in Jablon N. K., "Joint Blind Equalization, Carrier Recovery, and Timing Recovery for High-Order QAM Signal Constellations," IEEE Transactions on Signal Processing, Vol. 40, No. 6, pp 1383–1398, June 1992 (cited reference 1), for example. According to the cited reference 1, first, the coefficients $C_0$ to $C_{L-1}$ at the taps calculated by the coefficient updating circuit 8 are obtained as $$C_h(n+1)=C_h(n)-u \cdot e(n) \cdot x(n-h) \quad (8)$$

In equation (8), h is one of 0 to L−1. The character u is a constant which ensures convergence of the output signal y(n). The coefficient updating method expressed by equation (8) is called least mean square error (LMS) method.

The algorithm with which the carrier frequency error detecting circuit 5 in FIG. 13 detects the carrier frequency error is disclosed in Yamanaka K., et al., "A multilevel QAM Demodulator VLSI with Wideband Carrier Recovery and Dual Equalizing Mode," IEEE Journal of Solid-State Circuits, Vol. 32, No. 7, pp. 1101–1107, July 1997 (cited reference 2).

According to the cited reference 2, for example, the carrier frequency error detecting circuit 5 is constructed as shown in FIG. 17. First, the power calculating circuit 9 calculates electric power of the output signal y(n), i.e., $\sqrt{(yi^2+yq^2)}$. Next, the output decision result estimating circuit 10 selects at most four signals which are estimated to be ya(n) (ideal output signals y(n) which would be obtained from the output signal y(n) in the absence of distortion caused by frequency-selective fading etc.) as signals P1 to P4, from among some signals y(m) preceding an nth symbol period SP. Next, the phase angle calculating circuit 11 obtains phase angles E1 to E4 between the output signal y(n) and the signals P1 to P4. These operations are performed with nth, (n+1)th, and (n+2)th output signals, yn(n), y(n+1), y(n+2), to obtain nth, (n+1)th, and (n+2)th phase angles E1 to E4, for example. The phase error selecting circuit 12 selects one phase angle with the same value from among the three sets of phase angles E1 to E4 and defines it as the actual rotation angle of the symbol S. The phase error selecting circuit 12 obtains and outputs the detected result R1 about the carrier frequency error on the basis of the rotation angle of the symbol S.

In this way, the carrier frequency error detecting circuit 5 estimates the output decision result ya(n) on the basis of the power of the output signal y(n).

In the power calculating circuit 9 of FIG. 17, if the distortion error e(n) is large, the power of the output signal y(n) also largely varies, and then the output decision result ya(n) may be erroneously estimated. Accordingly, when the distortion error e(n) is so large, the carrier frequency error detecting circuit 5 in FIG. 13 cannot normally apply feedback control to the carrier frequency error removing circuit 3, and then the carrier frequency error cannot be converged to become small.

Typically, the algorithms applied to the error detecting circuit 7 to detect the distortion error e(n) include the DD (Decision Directed) method and the CMA (Constant Modulus Algorithm) method. However, the DD method and CMA method have their respective advantages and disadvantages. That is to say:

Advantage of DD method: the distortion error e(n) becomes much smaller than in the CMA method.

Disadvantage of DD method: the distortion error e(n) cannot be normally converged if the carrier frequency error is large.

Advantage of CMA method: the distortion error e(n) is normally converged even if the carrier frequency error is large.

Disadvantage of CMA method: the distortion error e(n) does not become smaller as compared with the DD method, but it converges at a limit value L1.

The reason for the advantage of the DD method will be described. In the DD method, the difference between the output decision result ya(n) and the actual output signal y(n) is taken as the distortion error e(n). That is to say, the DD method is represented as $$e(n)=y(n)-ya(n) \quad (9)$$

Since the difference between the output signal y(n) and the output decision result ya(n) is directly obtained as the distortion error e(n) in the DD method, the finally obtained distortion error e(n) can be converged at a very small value.

Next, the reason for the disadvantage of the DD method will be described. At the time when the adaptive equalizer 4 in FIG. 13 starts operation, the carrier remains in the input signal x(n) without being completely removed by the carrier frequency error removing circuit 3. That is to say, a carrier frequency error may occur. When a carrier frequency error occurs, the symbol S in the output signal y(n) rotates. When the symbol S rotates, then the power of the output signal y(n) also largely varies and the output decision result ya(n) in equation (9) may be erroneously estimated. Accordingly, in the DD method, the distortion error e(n) does not normally converge if the carrier frequency error is large.

Next, the reason for the advantage of the CMA method will be described. The CMA method is expressed as $$e(n)=y(n)\cdot[|y(n)|^2-R2] \qquad (10)$$

In equation (10), $|y(n)|$ indicates the amplitude of the output signal y(n), and R2 indicates a fixed value. Since the distortion error e(n) is obtained with the amplitude of the output signal y(n) in the CMA method expressed by equation (10), the distortion error e(n) normally converges even if the carrier frequency error is large.

The fixed value R2 is disclosed in Godrad D.N., "Self-Recovering Equalization and Carrier Tracking in Two Dimensional Data Communication Systems," IEEE Transactions on Communications, Vol.COM-28, No.11, pp.1867–1875, November 1980 (cited reference 3). According to the cited reference 3, $$R2=E[|ya(n)|^4]/E[|ya(n)|^2] \qquad (11)$$

In equation (11), $E[|ya(n)|^4]$ indicates an average of the fourth power of the amplitude of the output decision result ya(n), and $E[|ya(n)|^2]$ indicates an average of the square of the amplitude of the output decision result ya(n).

Next, the reason for the disadvantage of the CMA method will be described. According to equation (10), the distortion error e(n) is obtained on the basis of the difference between $|y(n)|^2$ and the fixed value R2. In the CMA method, as compared with the DD method in which the difference between the output signal y(n) and the output decision result ya(n) is directly taken as the distortion error e(n), the distortion error e(n) does not become so smaller but converge at the limit value L1.

The cited reference 1 discloses a method which takes advantages of both of CMA method and DD method. According to the cited reference 1, first, the adaptive equalizer 4 is operated by the CMA method to remove distortion due to frequency-selective fading to a certain extent. When the distortion error e(n) has become small to a certain extent, then the carrier frequency error detecting circuit 5 can normally apply feedback control to the carrier frequency error removing circuit 3. Then, after an elapse of a predetermined time period, the carrier frequency error removing circuit 3 and the carrier frequency error detecting circuit 5 are caused to operate. Thus the carrier frequency error converges to be smaller with the passage of time. However, with the CMA method, the distortion error e(n) does not become so small, but converge at the limit value L1. Accordingly, after an elapse of a predetermined certain time period again, the adaptive equalizer 4 is caused to operate with the DD method replacing the CMA method. This allows the distortion error e(n) to become very small, thus providing an ideal output signal y(n).

However, if the time period from when the carrier has been removed completely to when the algorithm is switched to the DD method is long, that is, if the predetermined certain time period is longer than an actually required time, it uselessly takes a longer time to obtain the ideal output signal y(n). Further, if the CMA method is switched to the DD method while the distortion error e(n) is too large to allow the carrier frequency error detecting circuit 5 to normally apply feedback control to the carrier frequency error removing circuit 3, that is to say, if the predetermined certain time period is shorter than an actually required time period, then the carrier frequency error detecting circuit 5 cannot apply normal feedback control to the carrier frequency error removing circuit 3 and then the carrier frequency error does not converge to become small. This raises the problem that the ideal output signal y(n) cannot be obtained.

SUMMARY OF THE INVENTION

According to a first aspect of the present invention, an adaptive equalizer device comprises: an adaptive equalizer receiving a signal indicating a symbol, for filtering the signal indicating the symbol to adaptively remove intersymbol interference by selectively using one of a plurality of preset algorithms; and a rotation detecting circuit receiving an output signal from the adaptive equalizer, for detecting rotation of the symbol of the output signal; wherein the adaptive equalizer receives the result detected by the rotation detecting circuit to select one of the plurality of algorithms in accordance with the detected result.

Preferably, according to a second aspect of the present invention, in the adaptive equalizer device, the rotation detecting circuit comprises a symbol protrusion detecting portion receiving the output signal, for detecting whether the symbol of the output signal exceeds a predetermined reference value, and a rotation period detecting portion receiving the result detected by the symbol protrusion detecting portion, for detecting whether the detected result from the symbol protrusion detecting portion indicates that the symbol exceeds the reference value within a given period and outputting the result as the detected result of the rotation detecting circuit.

Preferably, according to a third aspect of the present invention, in the adaptive equalizer device, the symbol is composed of a plurality of dots, each of the plurality of dots being represented by components on coordinates with a plurality of axes, and wherein the symbol protrusion detecting portion comprises a plurality of component protrusion detectors receiving the output signal, for detecting whether the components of the output signal exceed the reference value for respective axes on the coordinates with the plurality of axes, and a logic portion receiving results detected by the plurality of component protrusion detectors, for outputting OR of the detected results as the detected result of the symbol protrusion detecting portion, and the rotation period detecting portion comprises a counting portion for outputting a result of comparison in magnitude between a number obtained by counting particular ones in the detected result from the symbol protrusion detecting portion in the given period and a given value as the detected result of the rotation detecting circuit.

A fourth aspect of the present invention is directed to a method for controlling an adaptive equalizer which receives a signal indicating a symbol and filters the signal indicating the symbol to adaptively remove intersymbol interference by selectively using one of a plurality of preset algorithms, wherein an output signal from the adaptive equalizer is received, and rotation of the symbol of the output signal is detected, and one of the plurality of algorithms is selected in accordance with the detected result.

Preferably, according to a fifth aspect of the present invention, in the adaptive equalizer controlling method, the detected result indicates whether the symbol exceeds a predetermined reference value within a given period.

Preferably, according to a sixth aspect of the present invention, in the adaptive equalizer controlling method, the symbol is composed of a plurality of dots, each of the plurality of dots being represented by components on coordinates with a plurality of axes, and the detected result is obtained by comparing the components on a particular one of the axes of the coordinates and the reference value.

According to the first aspect of the present invention, one of a plurality of algorithms is selected in accordance with rotation of the symbol. Accordingly, an ideal output signal can be obtained certainly and in a shorter time. Further, for example, as compared with the technique disclosed in Japanese Patent Laying-Open No.5-244040, it is possible to switch from the CMA method to the DD method by more appropriate timing.

According to the second aspect of the present invention, the symbol protrusion detecting portion and the rotation period detecting portion detect whether the symbol has protruded within a given period. This enables determination as to whether the carrier frequency error is small to such an extent that the distortion error can be normally converged by the DD method, for example.

According to the third aspect of the present invention, it is possible to know whether the symbol has got beyond the reference value by comparing components on the I axis and the Q axis and a reference value, for example. On the basis of this idea, the symbol protrusion detecting portion can be realized with a simple structure by using the component protrusion detectors and the logic portion, and the rotation period detecting portion can be realized with a simple structure by using the counting portion.

According to the fourth aspect of the present invention, the adaptive equalizer is controlled in accordance with rotation of the symbol. This allows an ideal output signal to be obtained certainly and in a shorter time. Further, as compared with the technique disclosed in Japanese Patent Laying-Open No.5-244040, for example, it is possible to switch from the CMA method to the DD method by more appropriate timing.

According to the fifth aspect of the present invention, by detecting whether the symbol has protruded beyond the reference value within a given period, it is possible to determine that the carrier frequency error is small to such an extent that the distortion error can normally converge by the DD method, for example.

According to the sixth aspect of the present invention, whether the symbol has protruded beyond the reference value can be detected by comparing components on a particular axis and the reference value, and therefore a simpler algorithm can be used to obtain the detected result from the output signal of the adaptive equalizer.

The present invention has been made to solve the above-described problems. An object of the present invention is to provide an adaptive equalizer device and a method for controlling an adaptive equalizer which can obtain an ideal output signal certainly and in a shorter time.

BRIEF DESCRIPTION OF THE DRAWINGS

FIG. 16 is a block diagram showing a conventional adaptive equalizer.

FIG. 17 is a block diagram showing a conventional carrier frequency error detecting circuit.

DESCRIPTION OF THE PREFERRED EMBODIMENTS

Background of the Invention

Figure 1:
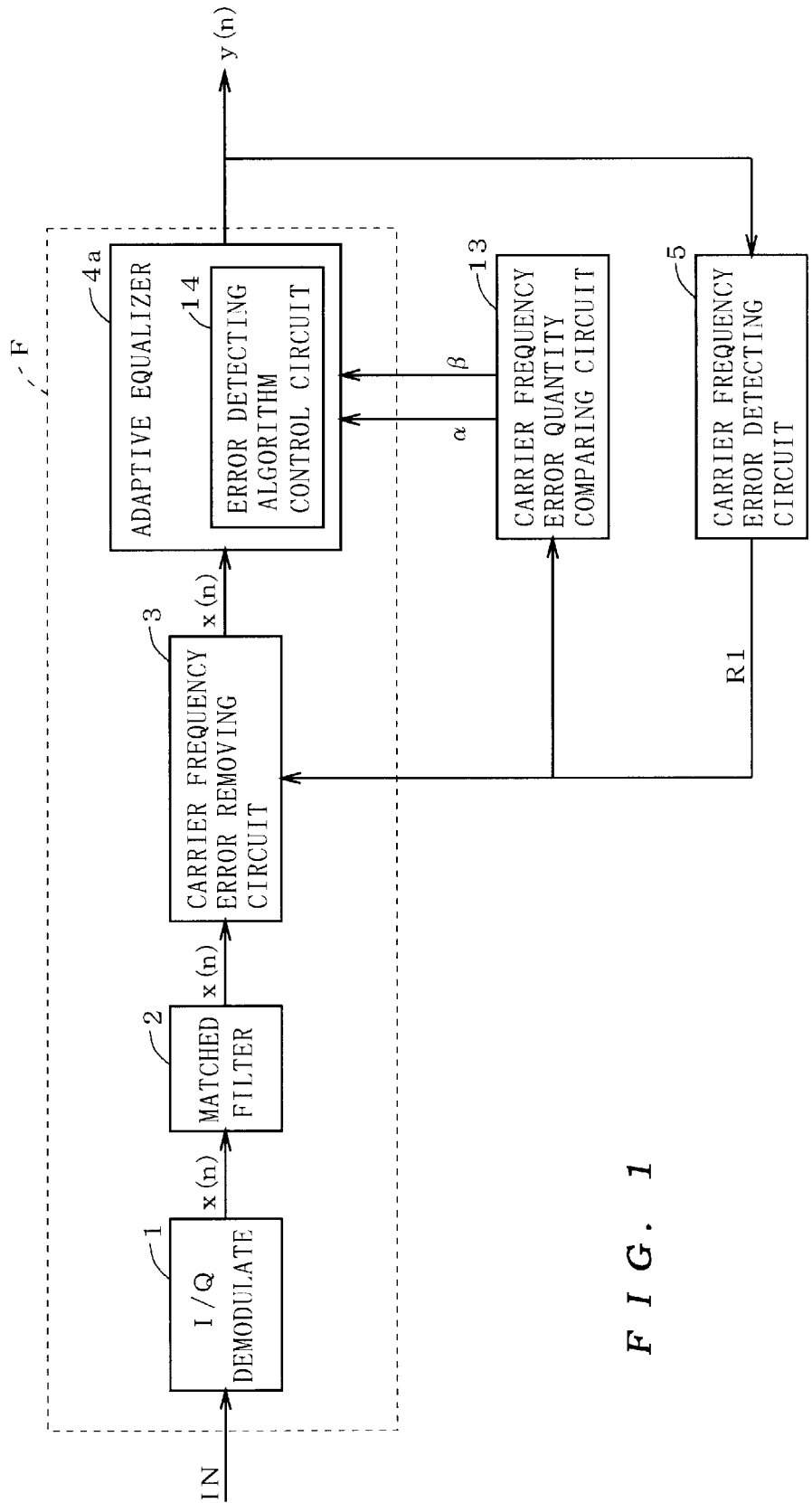
FIG. 1 is a block diagram showing an example of an adaptive equalizer device as a background of the present invention.

First, the background of the invention will be described. FIG. 1 is a block diagram showing part of an adaptive equalizer device as a background of the present invention. In FIG. 1, 4a denotes an adaptive equalizer as a background of the invention, and 13 denotes a carrier frequency error quantity comparing circuit. As has been explained in Description of the Background Art, the adaptive equalizer is a device for removing distortion caused by fading to adaptively remove intersymbol interference. The adaptive equalizer 4a includes an error detecting algorithm control circuit 14.

In FIG. 1, the I/Q demodulator 1 removes carrier from the received signal IN and separates the received signal IN into I (In-phase) component xi and Q (Quadrature) component xq. The matched filter 2 removes components in unwanted frequency bands and noise from the input signal x(n). The carrier frequency error removing circuit 3 removes the carrier frequency error from the input signal x(n). The adaptive equalizer 4a removes distortion due to frequency-selective fading from the input signal x(n) and outputs the distortion-removed input signal x(n) as the output signal y(n). The carrier frequency error detecting circuit 5 detects the carrier frequency error from the output signal y(n) and feedback controls the carrier frequency error removing circuit 3 with the detected result R1 about the carrier frequency error. The carrier frequency error quantity comparing circuit 13 feedback controls the adaptive equalizer 4a with the detected result R1 to more completely remove the distortion due to frequency-selective fading from the input signal x(n).

The I/Q demodulator 1, matched filter 2, carrier frequency error removing circuit 3 and adaptive equalizer 4a form a filter F, which receives the received signal IN indicating the symbol S and filters the received signal IN indicating the symbol S.

The carrier frequency error detecting circuit 5 may be constructed as shown in FIG. 17. That is to say, the power calculating circuit 9 calculates the power of the output signal y(n). Next, the output decision result estimating circuit 10 selects at most four signals which are estimated to be the output decision results ya(n) as signals P1 to P4 from among some output signals y(m) preceding an nth symbol period SP. Next, the phase angle calculating circuit 11 obtains phase angles E1 to E4 between the output signal y(n) and the signals P1 to P4. These operations are performed with nth, (n+1)th, and (n+2)th output signals, yn(n), y(n+1), y(n+2), to obtain nth, (n+1)th, and (n+2)th phase angles E1 to E4, for example. The phase error selecting circuit 12 selects one phase angle with the same value from among the three sets of phase angles E1 to E4 and takes it as the actual rotation angle of the symbol S. The phase error selecting circuit 12 obtains and outputs the detected result R1 about the carrier frequency error on the basis of the rotation angle of the symbol S.

Next, the carrier frequency error quantity comparing circuit 13 will be described referring to FIG. 2. The carrier frequency error quantity comparing circuit 13 includes an absolute value calculating circuit 15 and a comparator 16. Since the carrier frequency error indicated by the detected result R1 can take either of positive and negative values, the absolute value calculating circuit 15 calculates the absolute value, a, of the carrier frequency error indicated by the detected result R1. Next, the comparator 16 compares the absolute value, a, and a reference value, b, and if a>b, it sets a detected result flag α, and if a<b, it sets a detected result flag β.

Figure 3:
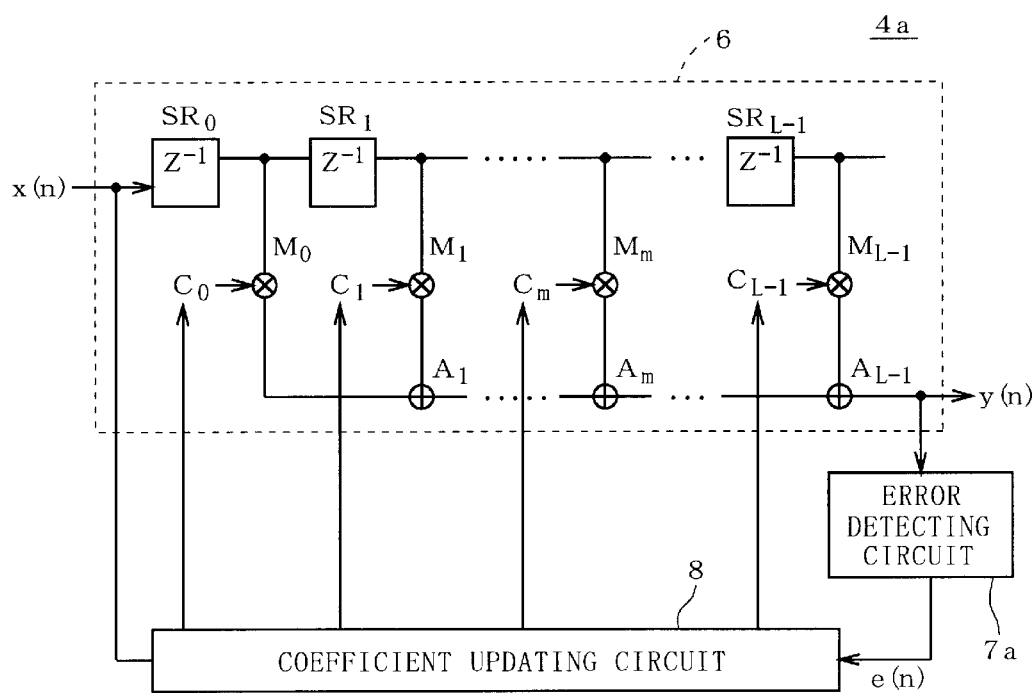
FIG. 3 is a block diagram showing an example of an adaptive equalizer of the background of the present invention.

Next, the adaptive equalizer 4a will be described referring to FIG. 3. The adaptive equalizer 4a is the same as that shown in FIG. 16 except for the error detecting circuit 7a. That is to say, in addition to the error detecting circuit 7a, the adaptive equalizer 4a includes the discrete filter 6, which serves as the main element, and the coefficient updating circuit 8. The discrete filter 6 includes shift registers $SR_0$ to $SR_{L-1}$, multipliers $M_0$ to $M_{L-1}$, and adders $A_1$ to $A_{L-1}$. The discrete filter 6 removes the distortion caused by frequency-selective fading from the input signal x(n) and outputs the distortion-removed input signal x(n) as the output signal y(n). The shift registers $SR_0$ to $SR_{L-1}$ delay the input signal x(n) by an amount of delay, $Z^{-1}$. Next, the multipliers $M^0$ to $M_{L-1}$ multiply signals at the respective output nodes (referred to as "taps") of the shift registers $SR_0$ to $SR_{L-1}$ and the coefficients $C_0$ to $C_{L-1}$. Next, the adders $A_1$ to $A_{L-1}$ add the multiplied results obtained by the multipliers $M_0$ to $M_{L-1}$. The sum of the multiplied results from the multipliers $M_0$ to $M_{L-1}$ corresponds to the output signal y(n). The error detecting circuit 7a detects the distortion error e(n) from the output signal y(n). Next, the coefficient updating circuit 8 calculates and updates the coefficients $C_0$ to $C_{L-1}$ on the basis of the distortion error e(n) and the input signal x(n). That is to say, the error detecting circuit 7a and the coefficient updating circuit 8 feedback controls the discrete filter 6.

Similarly to those explained in Description of the Background Art, the coefficients $C_0$ to $C_{L-1}$ at the respective taps calculated by the coefficient updating circuit 8 may be obtained by the method disclosed in the cited reference 1.

Figure 4:
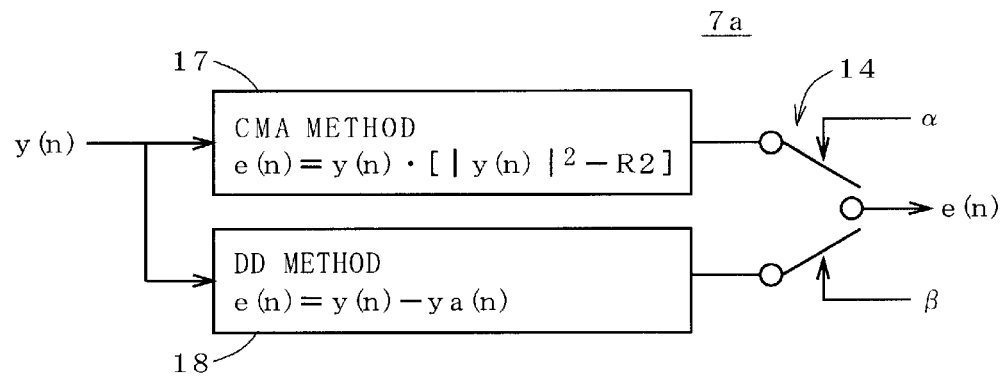
FIG. 4 is a block diagram showing an example of an error detecting circuit of the background of the present invention.

The error detecting circuit 7a will now be described referring to FIG. 4. The error detecting circuit 7a includes a CMA algorithm circuit 17, a DD algorithm circuit 18, and the error detecting algorithm control circuit 14 shown in FIG. 1. The CMA algorithm circuit 17 detects the distortion error e(n) from the output signal y(n) by using the CMA method. The DD algorithm circuit 18 detects the distortion error e(n) from the output signal y(n) by using the DD method. When the detected result flag α is being set, the error detecting algorithm control circuit 14 selects and outputs the distortion error e(n) from the CMA algorithm circuit 17, and when the detected result flag β is being set, it selects and outputs the distortion error e(n) from the DD algorithm circuit 18.

Figure 5:
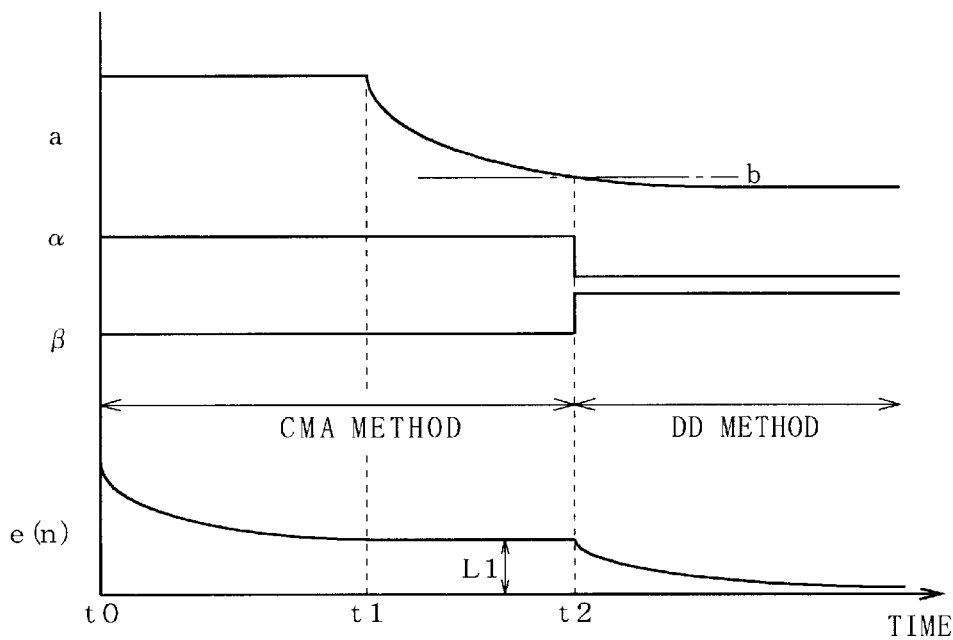
FIG. 5 is a timing chart showing operation of the adaptive equalizer device of the background of the present invention.

Next, operation of the portion including the carrier frequency error removing circuit 3, adaptive equalizer 4a, carrier frequency error detecting circuit 5, and carrier frequency error quantity comparing circuit 13 will be described referring to FIG. 5

The reference value b is previously adjusted so that the detected result flag β is set when the condition below is satisfied:

(A) the carrier frequency error is small to such an extent that the distortion error e(n) can be normally converged by the DD method.

The carrier frequency error removing circuit 3, the carrier frequency error detecting circuit 5, and the adaptive equalizer 4a start all together at time t0. Immediately after time t0, the distortion error e(n) is large, since the adaptive equalizer 4a has just started. Therefore the carrier frequency error detecting circuit 5 cannot normally apply feedback control to the carrier frequency error removing circuit 3, so that the absolute value, a, of the carrier frequency error does not converge to become small, but it stays larger than the reference value b. Hence the detected result flag α is set. Therefore the error detecting algorithm control circuit 14 selects the CMA algorithm circuit 17, i.e., the CMA method. Thus the distortion error e(n) normally converges regardless of the large carrier frequency error.

The adaptive equalizer 4a gradually removes the distortion due to frequency-selective fading and the distortion error e(n) becomes smaller as time passes after time t0, toward the limit value L1 in the CMA method. When the distortion error e(n) has become small to a certain extent, the carrier frequency error detecting circuit 5 can normally apply feedback control to the carrier frequency error removing circuit 3 at time t1. Then the carrier frequency error removing circuit 3 gradually removes the carrier from the input signal x(n) and the absolute value, a, of the carrier frequency error becomes smaller with time.

Then, at time t2, the absolute value a of the carrier frequency error becomes smaller than the reference value b. At this time, the condition (A) is satisfied, and so the detected result flag β is set. Accordingly the error detecting algorithm control circuit 14 selects the DD algorithm circuit 18, i.e., the DD method.

After time t2, the carrier frequency error is so small that the distortion error e(n) is normally converged by the DD method. Thus the distortion error e(n) normally converges to become very small and an ideal output signal y(n) is obtained.

Figure 6:
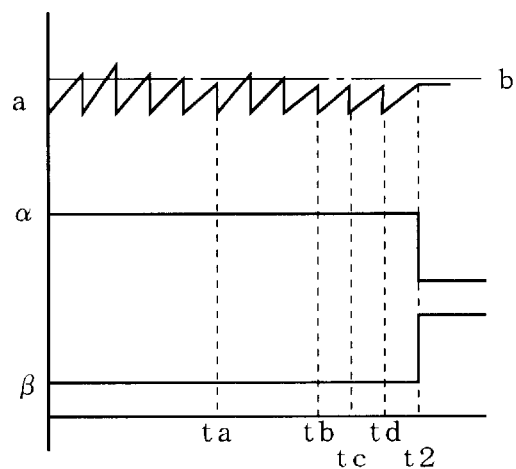
FIG. 6 is a timing chart showing the operation of the adaptive equalizer device of the background of the present invention.
Figure 14:
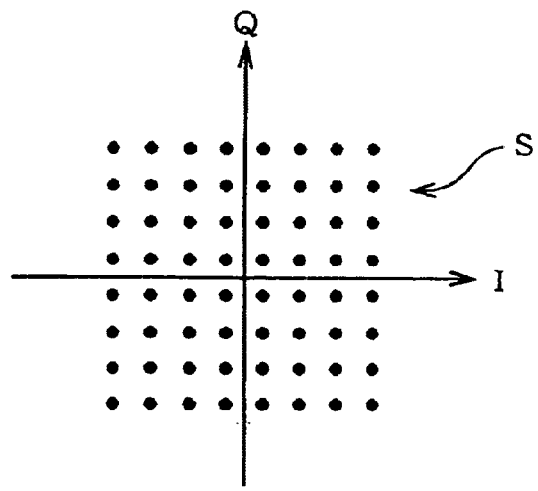
FIGS. 14 and 15 are conceptual diagrams showing an example of an output signal.
Figure 15:
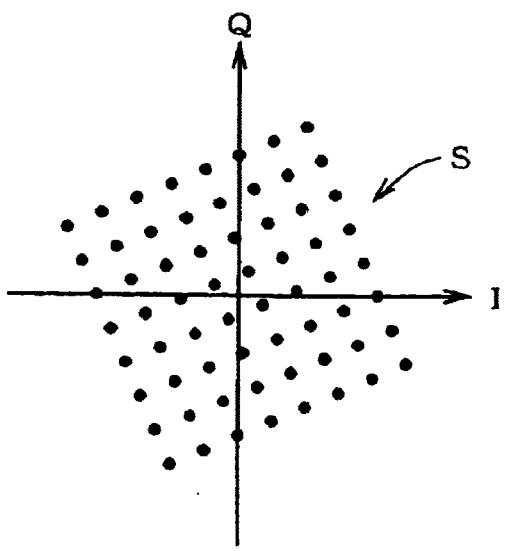

FIG. 6 shows the operation around time t2 in an enlarged manner. As shown in FIG. 6, before time t2, the absolute value, a, of the carrier frequency error varies over and below the reference value b. This occurs because of the following reason. The fact that the distortion error e(n) is large means that the output signal y(n) is away from the ideal symbol S (see FIG. 14, for example.) In the CMA method, even when the distortion error e(n) is converged, it does not become smaller below the limit value L1. Accordingly the output signal y(n) is away from the ideal symbol S (e.g., see FIG. 14). This is the reason why the absolute value a of the carrier frequency error varies over and below the reference value b.

Figure 2:
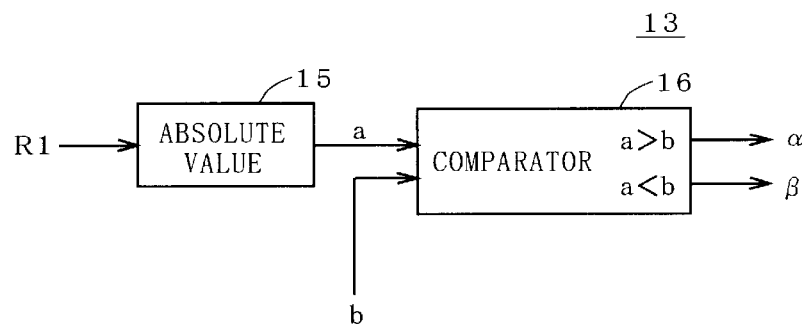
FIG. 2 is a block diagram showing an example of a carrier frequency error quantity comparing circuit of the background of the present invention.

As shown in FIG. 2, at time "ta," the peak of the absolute value a (the upper peak in the drawing) temporarily become smaller than the reference value b. However, as time passes, at time tb, tc, and td, the peaks of the absolute value a are continuously smaller than the reference value b. Accordingly, for example, the comparator 16 shown in FIG. 2 samples the absolute value a at the symbol cycle and determines that the condition (A) has been satisfied when the sampled absolute value a has been smaller than the reference value b continuously in three times, and then sets the detected result flag β.

Figure 7:
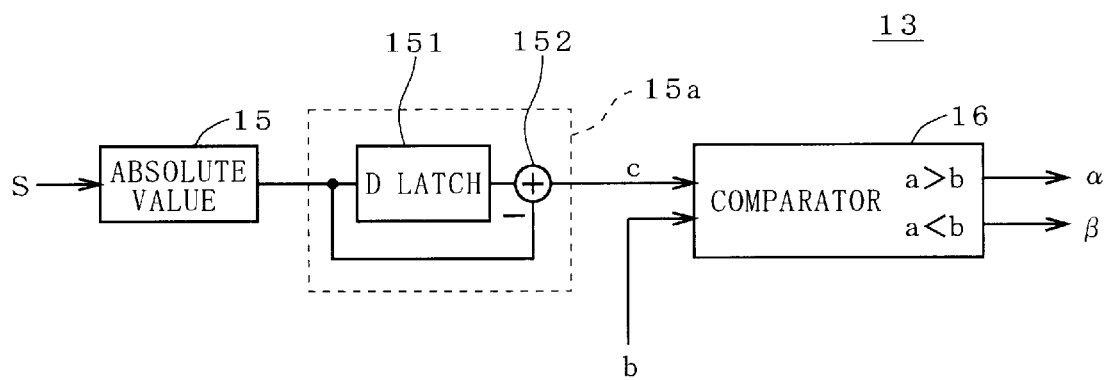
FIG. 7 is a block diagram showing an example of the carrier frequency error quantity comparing circuit of the background of the invention.

Or, as shown in FIG. 7, the carrier frequency error quantity comparing circuit 13 may further comprise a differentiator 15a for generating a difference, c, between the absolute value, a, in an nth symbol period SP and the absolute value, a, in the (n+1)th symbol period SP. In this case, the difference c shows the amount of change in the absolute value a. Accordingly, the comparator 16 in FIG. 7 determines that the condition (A) has been satisfied when the amount of change in the absolute value a is within a reference value b set for the circuit of FIG. 7 in three continuous times, for example, and then it sets the detected result flag β. The differentiator 15a includes a D latch 151 for holding the absolute value a in an nth symbol period SP and a subtracter 152 for producing the difference c between the absolute value a in the nth symbol period SP held in the D latch 151 and the absolute value a in the (n+1)th symbol period SP.

According to the background of the invention, at the time when the carrier frequency error comparing circuit 13 confirms that the condition (A) is satisfied, the algorithm is automatically switched from the CMA method to the DD method. This provides an ideal output signal y(n) more certainly and in a shorter time, as compared with the conventional method in which the CMA method is switched to the DD method after a given period of time has passed.

With the carrier frequency error quantity comparing circuit 13 in the background of the invention, the algorithm may not be switched from the CMA method to the DD method by appropriate timing, because the carrier frequency error and the phase error vary up and down. The first preferred embodiment described below solves this problem.

First Preferred Embodiment

Figure 8:
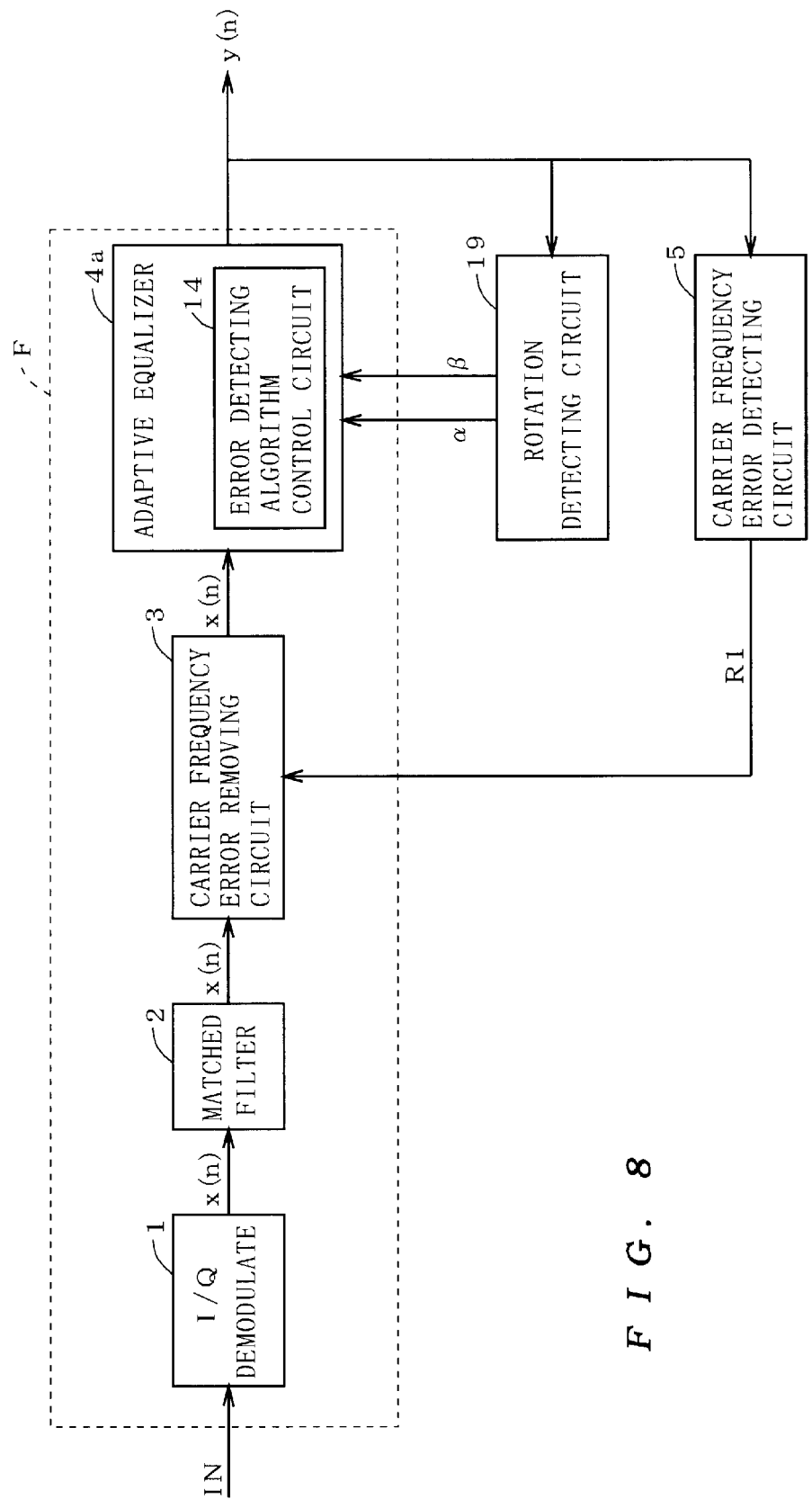
FIG. 8 is a block diagram showing an example of an adaptive equalizer device according to a first preferred embodiment of the present invention.

FIG. 8 is a block diagram showing part of an adaptive equalizer device according to a first preferred embodiment of the present invention. The adaptive equalizer device shown in FIG. 8 comprises a rotation detecting circuit 19 in place of the carrier frequency error quantity comparing circuit 13.

Figure 9:
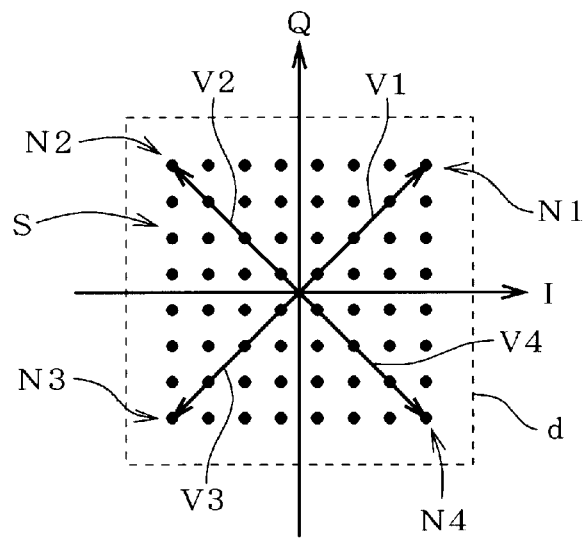
FIGS. 9 and 10 are symbol point arrangement diagrams used to describe operation of the adaptive equalizer device according to the first preferred embodiment of the present invention.
Figure 10:
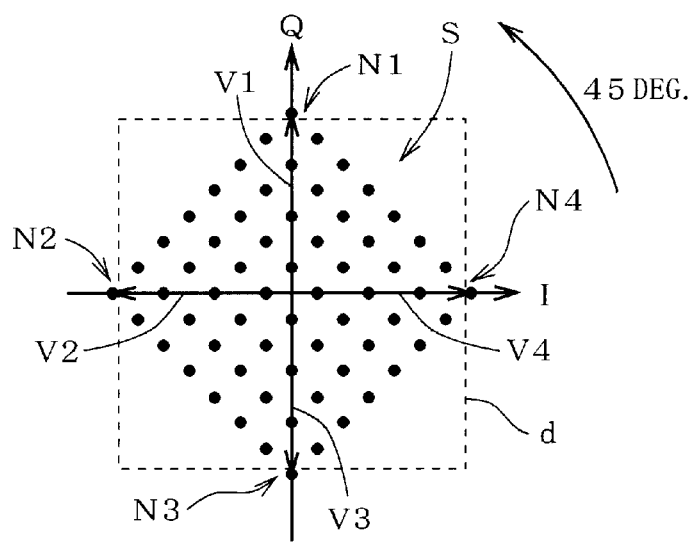

The concept of operation of the rotation detecting circuit 19 will be described in detail referring to FIG. 9 and FIG. 10. FIG. 9 corresponds to FIG. 14. In FIG. 9, N1 to N4 are four outermost dots positioned in the outmost part among the 64 dots and having the largest amplitude about the origin among the 64 dots, and V1 to V4 are vectors from the origin to the outermost dots N1 to N4, respectively. When a carrier frequency error occurs, the symbol S of the output signal y(n) rotates, and at a certain time, it has rotated by 45 degrees from the state shown in FIG. 9 to the state shown in FIG. 10. At the time shown in FIG. 10, the vectors V1 to V4 are on the I axis and the Q axis. For example, a reference value d is set such that the outermost dots N1 to N4 protrude beyond it on the I axis and Q axis, for example. When the symbol S protrudes over the reference value d as shown in FIG. 10, it is known that the symbol S has rotated. The rotation detecting circuit 19 detects rotation of the symbol S in this way.

The fact that the symbol rotates means that a carrier frequency error is occurring. Hence, it is possible by detecting the rotation of the symbol S to know whether the carrier frequency error is small to such an extent that the distortion error e(n) can be normally converged by the DD method, that is, whether the condition (A) is satisfied. When detecting that the symbol S is not rotating by the method described later, for example, the rotation detecting circuit 19 determines that the condition (A) has been satisfied and sets the detected result flag β, and otherwise sets the detected result flag Next, the operation made by the portion including the carrier frequency error removing circuit 3, the adaptive equalizer 4a, the carrier frequency error detecting circuit 5, and the rotation detecting circuit 19 will be described referring to FIG. 5.

The carrier frequency error removing circuit 3, the carrier frequency error detecting circuit 5, and the adaptive equalizer 4a start all together at time t0. Immediately after time t0, the distortion error e(n) is large, because the adaptive equalizer 4a has just started. Therefore the carrier frequency error detecting circuit 5 cannot normally apply feedback control to the carrier frequency error removing circuit 3, so that the carrier frequency error does not converge to become small. Hence the symbol S rotates. The rotation detecting circuit 19 determines that the symbol S is rotating by using the structure described later, for example, and determines that the condition (A) is not satisfied, and hence it sets the detected result flag α. Therefore the error detecting algorithm control circuit 14 selects the distortion error e(n) from the CMA algorithm circuit 17, i.e., the CMA method. Thus the distortion error e(n) normally converges regardless of the large carrier frequency error.

The adaptive equalizer 4a gradually removes the distortion due to frequency-selective fading and the distortion error e(n) becomes smaller as time passes after time to, toward the limit value L1 in the CMA method. When the distortion error e(n) has become small to a certain extent, the carrier frequency error detecting circuit 5 can normally apply feedback control to the carrier frequency error removing circuit 3 at time t1. Then the absolute value, a, of the carrier frequency error becomes smaller with time. As the absolute value a of the carrier frequency error becomes smaller, the rotation angle of the symbol S becomes smaller.

Then, at time t2, the symbol S becomes almost fixed, not rotating. The rotation detecting circuit 19 determines that the symbol S is not rotating by the structure described later, for example, and determines that the condition (A) is satisfied, and sets the detected result flag β. Accordingly the error detecting algorithm control circuit 14 selects the distortion error e(n) from the DD algorithm circuit 18, i.e., the DD method.

After time t2, the carrier frequency error is small enough to allow the distortion error e(n) to be normally converged by the DD method. Accordingly the distortion error e(n) normally converges to become very small and an ideal output signal y(n) is thus obtained.

Figure 11:
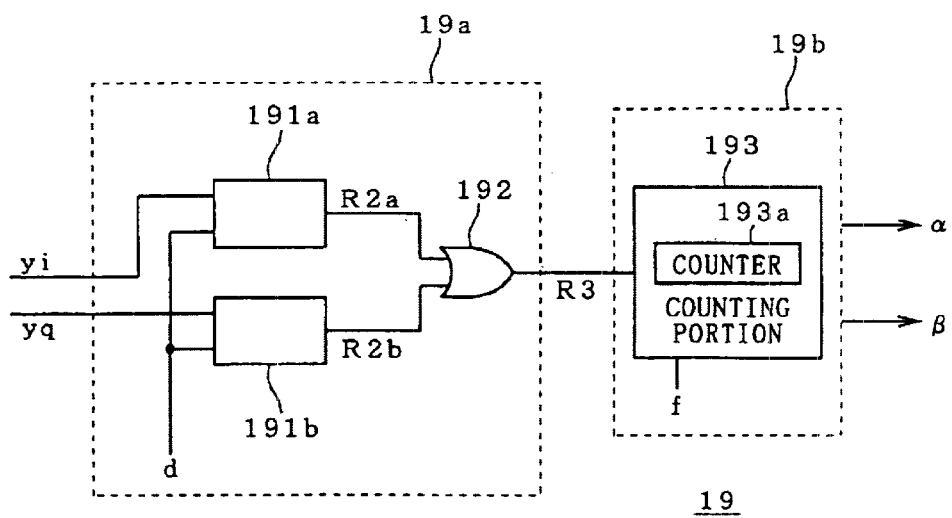
FIG. 11 is a block diagram showing an example of a rotation detecting circuit according to the first preferred embodiment of the present invention.
Figure 12:
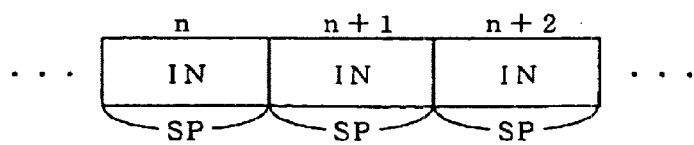
FIG. 12 is a conceptual diagram showing a received signal.
Figure 13:
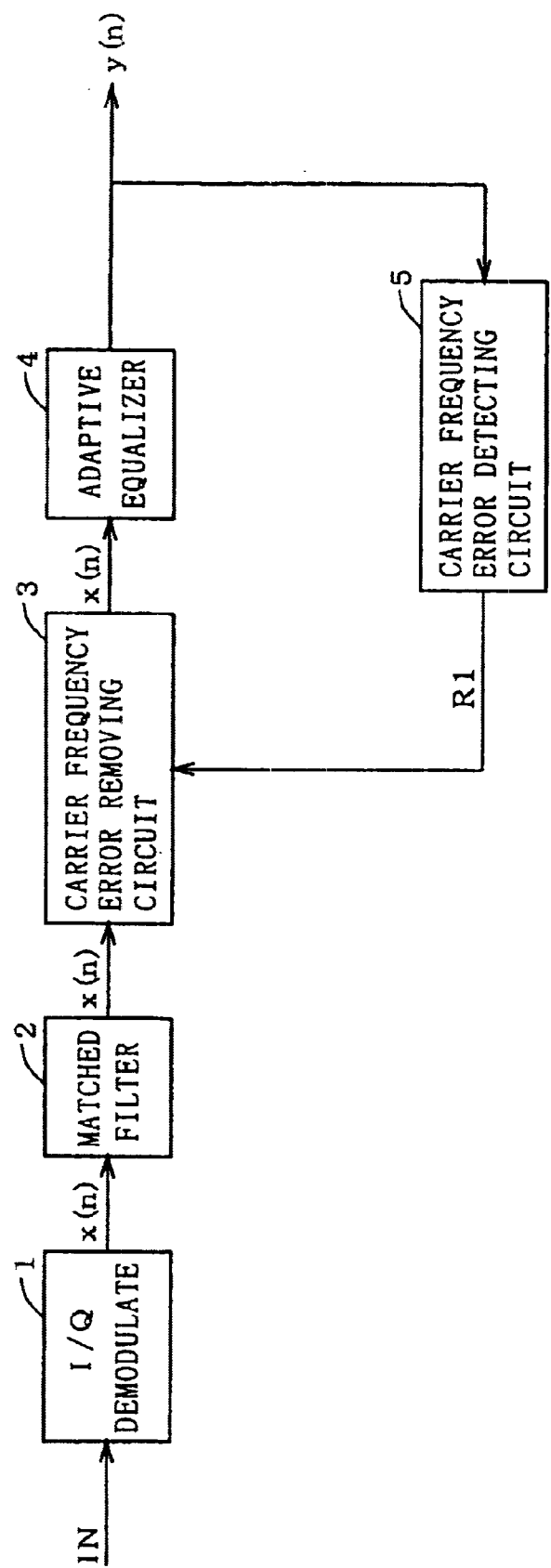
FIG. 13 is a block diagram showing a conventional adaptive equalizer device.

FIG. 11 shows an example of the internal structure of the rotation detecting circuit 19. The rotation detecting circuit 19 includes a symbol protrusion detecting portion 19a and a rotation period detecting portion 19b. The symbol protrusion detecting portion 19a includes component protrusion detectors (comparators) 191a and 191b, and a logic portion 192. The rotation period detecting portion 19b includes a counting portion 193. The counting portion 193 includes a counter 193a as its main structural element.

The component protrusion detector 191a compares the component yi and the reference value d. When the component yi gets out of the reference value d, that is, if yi>d, it outputs "1," and in other cases it outputs "0," as a comparison result R2a. The component protrusion detector 191b compares the component yq and the reference value d. When the component yq gets out of the reference value d, that is, if yq>d, it outputs "1," and in other cases it outputs "0," as a comparison result R2b. The logic portion 192 outputs OR of the comparison results R2a and R2b from the component protrusion detectors 191a and 191b as a detection result R3 of the symbol protrusion detecting portion 19a. The detection result R3 is sequentially outputted in synchronization with the symbol period. The counter 193a in the counting portion 193 counts the number of the detection results R3 at "0" among the detection results R3 sequentially sent from the symbol protrusion detecting portion 19a. When the detection result R3 at "1" is sent from the symbol protrusion detecting portion, the counting portion 193 resets the count value in the counter 193a to zero. Further, when the count value exceeds a given value f, the counting portion 193 sets the detected result flag β, and otherwise sets the detected result flag α.

Next, the operation will be described referring to FIG. 5. Here, it is assumed for description that the symbol S rotates by 45 degrees in 100 periods of the symbol periods immediately before time t2. In this case, the number of detection results R3 at "0" occurring in 100 periods of the symbol periods is given as 64 (the number of dots forming the symbol S)×100 (the appropriate number of symbol periods), and the given value f is previously adjusted so that the detected result flag β is set at time t2, i.e., when the condition (A) is satisfied.

First, at time t0, the component yi and the component yq exceed the reference value d and the logic portion 192 outputs "1," and the count value in the counting portion 193 is reset to zero before the given value α is exceeded. In this way, when the symbol S rotates, the detected result flag α is set. As the time passes, the distortion error e(n) gradually becomes smaller and the rotation angle of the symbol S also becomes smaller. At last, at time t2, the symbol S does not rotate by 45 degrees in 100 periods of the symbol periods any longer, and the component yi and the component yq do not exceed the reference value d. Then the count value in the counting portion 193 exceeds the given value f and the detected result flag β is set. In this way, the counting portion 193 outputs the result of comparison in magnitude between the number of detection results R3 at "0" provided by the symbol protrusion detecting portion 19a in 100 periods of the symbol periods and the given value f, as the detected result flags α and β from the rotation detecting portion 19. The given value f is adjusted in advance so that the detected result flag β is set when the condition (A) is satisfied.

The symbol protrusion detecting portion 19a thus detects whether the symbol S protrudes beyond the reference value d. The rotation period detecting portion 19b receives the detection result R3 from the symbol protrusion detecting portion 19a. When the detection result R3 indicates that the symbol S gets beyond the reference value d within a given period, within 100 periods of the symbol periods, for example, it determines that the symbol S is rotating and sets the flag α. When the detection result R3 does not indicate that the symbol S protrudes beyond the reference value d within the given period, within the 100 periods of the symbol periods, it determines that the symbol S is not rotating and sets the flag 3. In this way, the symbol protrusion detecting portion 19a and the rotation period detecting portion 19b realize the operation of the rotation detecting circuit 19.

According to the first preferred embodiment, at the time when the rotation detecting circuit 19 confirms that the condition (A) is satisfied, the algorithm is automatically switched from the CMA method to the DD method. This enables an ideal output signal y(n) to be obtained more certainly in a shorter time period, as compared with the conventional method in which the CMA method is switched to the DD method after an elapse of a given time period.

As has been described referring to FIG. 6, the carrier frequency error varies up and down across the reference value b. The carrier frequency error quantity comparing circuit 13 shown in FIG. 2 and FIG. 7 switches the CMA method to the DD method on the basis of simple comparison between the magnitude of signal (the absolute value, a, of the carrier frequency error) and the reference value. Japanese Patent Laying-Open No.5-244040 about an adaptive equalizer also discloses a method in which the CMA method is switched to the DD method on the basis of simple comparison between phase error corresponding to the carrier frequency error and a reference value. Accordingly, in the carrier frequency error quantity comparing circuit 13 and the above-cited reference, the CMA method may not be switched to the DD method by appropriate timing because the carrier frequency error and the phase error vary up and down. In contrast, according to the first preferred embodiment, the rotation detecting circuit 19 determines timing for switching from the CMA method to the DD method not on the basis of magnitude of signal but on the basis of rotation of the symbol S. Accordingly, even if the carrier frequency error varies up and down, it is possible to switch the CMA method to the DD method by more appropriately timing than in the carrier frequency error quantity comparing circuit 13 and the cited reference, regardless of the variation of the carrier frequency error.

Further, the symbol protrusion detecting portion 19a and the rotation period detecting portion 19b detect whether the symbol S has protruded in a given period. It is thus possible to decide that the carrier frequency error is small to such an extent that the distortion error e(n) can normally converge by the DD method.

Moreover, as shown in FIG. 10, for example, it can be known whether the symbol S protrudes beyond the reference value d by comparing the components on the I axis and the Q axis and the reference value d. On the basis of this idea, the symbol protrusion detecting portion 19a can be realized with a simple structure by using the component protrusion detectors 191a and 191b and the logic portion 192, and the rotation period detecting portion 19b can be realized with a simple structure by using the counting portion 193 comprising the counter 193a as its main structural element.

Modifications

The background of the invention and the first preferred embodiment use the two error detecting algorithms: the CMA method and the DD method. However, the algorithms are not limited to the two, but any algorithm which can cause the distortion error e(n) to rapidly converge regardless of the presence of carrier frequency error may be used in place of the CMA method, and any algorithm which can cause the distortion error e(n) to accurately converge may be used in place of the DD method.

Further, although the adaptive equalizer 4a is controlled by hardware, i.e., by the carrier frequency error quantity comparing circuit 13 or the rotation detecting circuit 19 in the background of the invention and the first preferred embodiment, the adaptive equalizer 4a may be controlled on the basis of program.

While the present invention has been described in detail, the foregoing description is in all aspects illustrative and not restrictive. It is understood that numerous other modifications and variations can be devised without departing from the scope of the invention.

We claim:

1. An adaptive equalizer device comprising:
   an adaptive equalizer receiving a signal indicating a symbol, for filtering said signal indicating said symbol to adaptively remove intersymbol interference by selectively using one of a plurality of preset algorithms; and
   a rotation detecting circuit receiving an output signal from said adaptive equalizer, for detecting rotation of said symbol of said output signal, wherein said rotation detecting circuit comprises
      a symbol protrusion detecting portion receiving said output signal, for detecting whether said symbol of said output signal exceeds a predetermined reference value, and
      a rotation period detecting portion receiving the result detected by said symbol protrusion detecting portion, for detecting whether said detected result from said symbol protrusion detecting portion indicates that said symbol exceeds said reference value within a given period and outputting the result as said detected result of said rotation detecting circuit;
   wherein said adaptive equalizer receives the result detected by said rotation detecting circuit to select a CMA (Constant Modulus Algorithm) method of said plurality of preset algorithms when the symbol is rotating and to select a DD (Decision Directed) method of said plurality of preset algorithms when the symbol is not rotating.

2. The adaptive equalizer device according to claim 1, wherein said symbol is composed of a plurality of dots, each said dots being represented by components on coordinates with a plurality of axes,
   and wherein said symbol protrusion detecting portion comprises,
      a plurality of component protrusion detectors receiving said output signal, for detecting whether said components of said output signal exceed said reference value for respective axes on said coordinates with the plurality of axes, and
      a logic portion receiving results detected by said plurality of component protrusion detectors, for performing a logical OR of said detected results and for outputting thereof as said detected result of said symbol protrusion detecting portion, and
   said rotation period detecting portion comprises a counting portion for outputting a result of comparison in magnitude between a number obtained by counting particular ones in said detected result from said symbol protrusion detecting portion in said given period and a given value as said detected result of said rotation detecting circuit.

3. A method for controlling an adaptive equalizer comprising the steps of:
   receiving a signal indicating a symbol and filtering said signal indicating said symbol to adaptively remove intersymbol interference by selectively using one of a plurality of preset algorithms;
   receiving an output signal from said adaptive equalizer, and detecting rotation of said symbol of the output signal, wherein said detected result indicates whether said symbol exceeds a predetermined reference value within a given period,
   wherein said symbol is composed of a plurality of dots, each said dots being represented by components on coordinates with a plurality of axes,
   and wherein said detected result is obtained by comparing said components on a particular one of the axes of said coordinates and said reference value; and
   selecting a CMA (Constant Modulus Algorithm) method of said plurality of algorithms when the symbol is rotating and selecting a DD (Decision Directed) method of said plurality of algorithms when the symbol is not rotating.

* * * * *